United States Patent [19]
Kaiser et al.

[11] Patent Number: 4,580,056
[45] Date of Patent: Apr. 1, 1986

[54] NEUTRON EVENT COUNTING CIRCUIT

[75] Inventors: Bruce J. Kaiser, Wilmington; William Masaitis, Castle Hayne, both of N.C.

[73] Assignee: General Electric Company, San Jose, Calif.

[21] Appl. No.: 632,004

[22] Filed: Jul. 18, 1984

[51] Int. Cl.[4] ............................................. G01T 3/00
[52] U.S. Cl. .................................... 250/390; 250/392; 250/253
[58] Field of Search ...................... 250/336.1, 369, 390, 250/392, 253, 255

[56] References Cited

U.S. PATENT DOCUMENTS 3,225,200 12/1965 Gey et al. ............................ 250/392
3,612,872 10/1971 Omohundro ........................ 250/392
4,056,725 11/1977 Kamburov et al. ................. 250/392
4,476,384 10/1984 Westphal ............................. 250/369

Primary Examiner—Janice A. Howell
Attorney, Agent, or Firm—Ivor J. James, Jr.; Samuel E. Turner; Raymond G. Simkins

[57] ABSTRACT

An electronic circuit provides various accurate counts of detected neutrons to enable the assaying of fissile material in a neutron emitting radioactive source. The circuit develops a time correlated window associated with each detected neutron, and delays these windows to develop uncorrelated windows. These windows are used to develop separate detected neutron counts which distinguish between time correlated fission neutron detections and time uncorrelated singular neutron detections. The circuit also develops a count of all detected neutrons.

11 Claims, 2 Drawing Figures

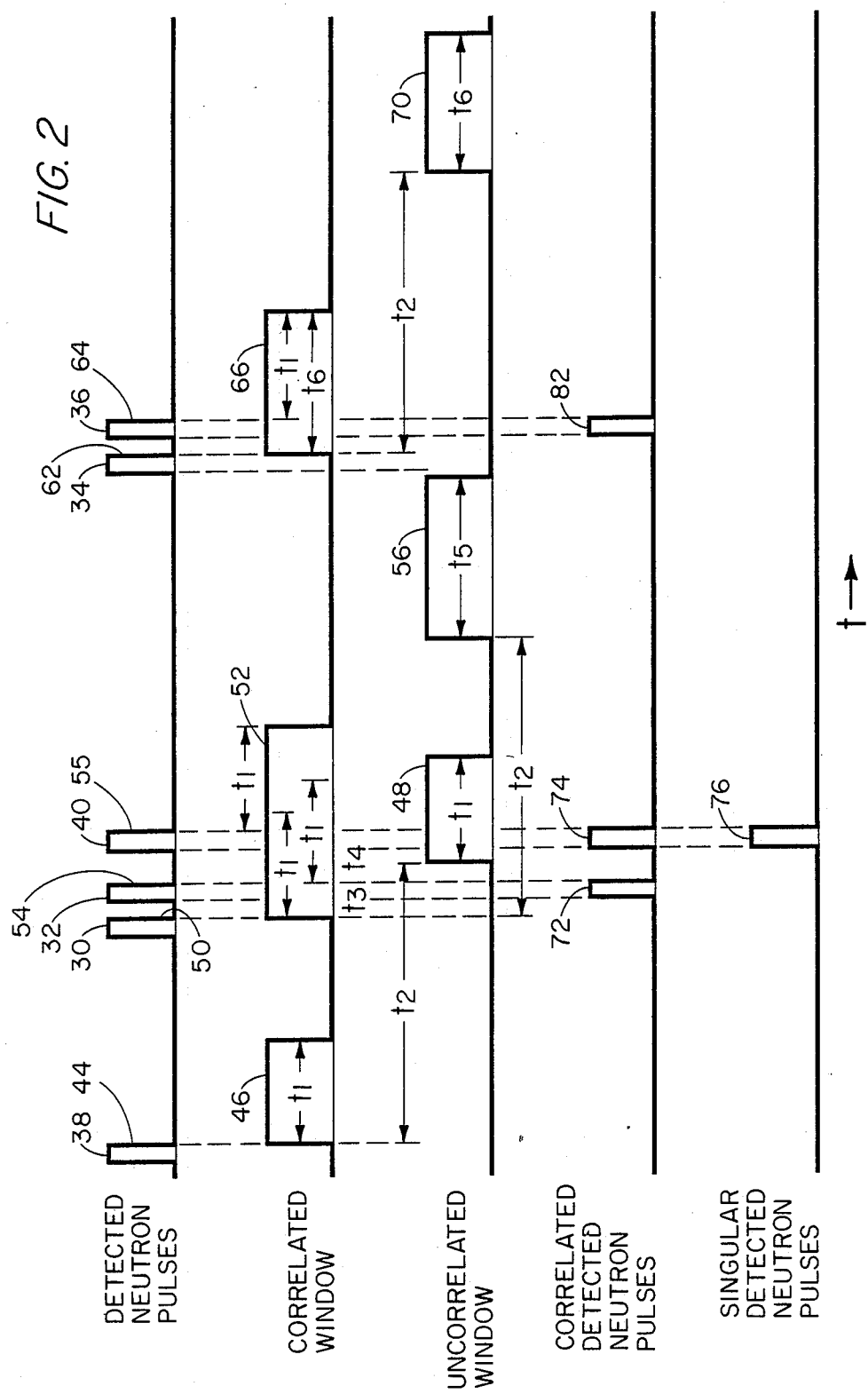

NEUTRON EVENT COUNTING CIRCUIT

FIELD OF THE INVENTION

This invention relates to a circuit for counting neutron emission events in proportion to their type in a uranium bearing sample, a count of the fission events being statistically related to the quantity of fissionable material in the sample.

BACKGROUND OF THE INVENTION

It is known in the art that fission neutrons, emitted from a single fission event, usually occur in groups of more than one neutron which are emitted at virtually the same instant in time. Other free neutrons, termed "singular neutrons" herein, occur individually and are distributed essentially randomly in time. For a given material to be analyzed the average number of neutrons per group is known. Essentially all free neutrons detected from a fission event will be detected within a relatively short period of time subsequent to the first neutron detected from that event. Various neutron counting circuits exist in the art which use this property to develop various indicative counts related to determining the number of fission events occurring in a sample.

The Gey et al patent (U.S. Pat. No. 3,225,200) discloses a device suitable for accumulating two counts, $N_1$ and $N_2$, related respectively to, (1) the total number of free neutrons being produced in a sample, and (2) the total number of fission events ocuring in the sample plus the number of singular neutrons occuring in the sample. The device disclosed by Gey et al generates the second of the above two mentioned counts by introducing a dead time element into the transmission line coupling the neutron detector to one of two counters. Essentially all neutrons related to a given fission event will be detected within a time period T subsequent to the first neutron detected from the event. The dead time in the circuit occurs subsequent to a detected neutron and is selected to embrace the aforesaid time period T. Thus, neutrons detected within T are not included in the count $N_2$. It is assumed that a statistically insignificant number of free neutrons is missed by this arrangement. The number of fission events occuring may then be calculated by subtracting $N_2$ from $N_1$ and dividing that result by one less than the average number of neutrons emitted per fission event.

The Omohundro et al patent (U.S. Pat. No. 3,612,872) discloses a circuit likewise adapted to generate two neutron event counts, though the second of these counts differs from that developed by the Gey et al device. Specifically, a gross count is developed at a first counter. A second count is developed by delaying the pulse train of detected neutrons by a time period similar to T above, and counting such delayed pulses of that train which then occur coincidentally, or within a certain other time period $T_1$ following gates generated by later detected neutrons. The patent teaches that this count registers non-fission event neutrons only. Substantially different first and second counts indicate a source as being fissionable.

Devices constructed according to the principle of the instant invention are intended for use in industrial environments. The samples to be analyzed typically comprise materials including small quantities of low level radioactive substances. Typical of such samples would be the ash of clothing which had been exposed to enriched uranium dioxide powder and then incinerated. In such ash the relative frequency of fission event related neutrons to other neutron events would be quite small. Events appearing like neutron events to an electrical counting circuit, such as static discharges, can also occur. In fact, the fission event related neutron count may be close to insignificant when compared to the gross number of events occuring.

SUMMARY OF THE INVENTION

A general object of this invention is to provide a new and improved counting circuit which overcomes the deficiencies of the prior art circuits and methods described above by developing counts of detected neutrons that can be used in assaying the quantity of fissionable material in a radioactive source.

Another object of the invention is to provide a counting circuit of the above-character which develops various accurate counts of detected neutrons emitted by a radioactive source comprising both fissionable and non-fissionable material.

Another object of the invention is to provide a counting circuit of the above character which provides a first count indicative of time correlated neutron events, including fission related neutron events and further provides a second count indicative of background or random, non-fission neutron events, accumulated over a period of time equal in net length to the time period over which the first count is accumulated, whereby a fission related neutron event rate can be determined.

Another object of the invention is to develop a count directly related to fission events in a sample, avoiding a determination of fission events which is inferred from the number of gross events occuring in the sample.

Another object of the invention is to provide a counting circuit of the above-character which can be used to develop counts of any countable event and distinguishes between those events occuring in a time correlated manner and time uncorrelated events occuring singularly.

The objects of this invention are accomplished by a new, simple and accurate detected neutron counting circuit. The circuit of this invention generates a time correlated event window pulse for a first predetermined maximum duration, in response to a detected neutron. Each window pulse, associated with a specific detected neutron, enables the circuit to emit a correlated event count pulse if the next detected neutron occurs within the time duration of the event window.

The time event correlated window is extended for at least the aforesaid predetermined maximum duration for each such subsequent neutron event. An event window comprises a series of window pulses occuring adjacently. A count is accumulated of all detected neutrons which occur during an event window. Every correlated window generated by the circuit is delayed for a predetermined duration generating a delayed coincidence window of duration equal to the associated time event correlated window. A second count is accumulated of all detected neutrons which occur during such delayed coincidence windows. The circuit of this invention also accumulates a third count of all detected neutrons.

Since, as will be discussed in more detail below, neutrons emitted by a radioactive source are generally of two types; neutrons emitted as a result of fission reactions, and singular neutrons emitted randomly as a result of nonfission reactions, the counts developed by this circuit can be used to assay the fissionable material contained in a radioactive source.

The foregoing and other objects and advantages of the present invention will become apparent as the description proceeds.

BRIEF DESCRIPTION OF THE DRAWINGS

While this specification terminates with claims specifically defining and setting forth what is considered to be the present invention, a clearer understanding thereof may be had from the following description taken in conjunction with the following drawings in which:

FIG. 2 is a timing diagram illustrating the operation of the invention shown in FIG. 1.

DESCRIPTION OF THE PREFERRED EMBODIMENT

Figure 1:
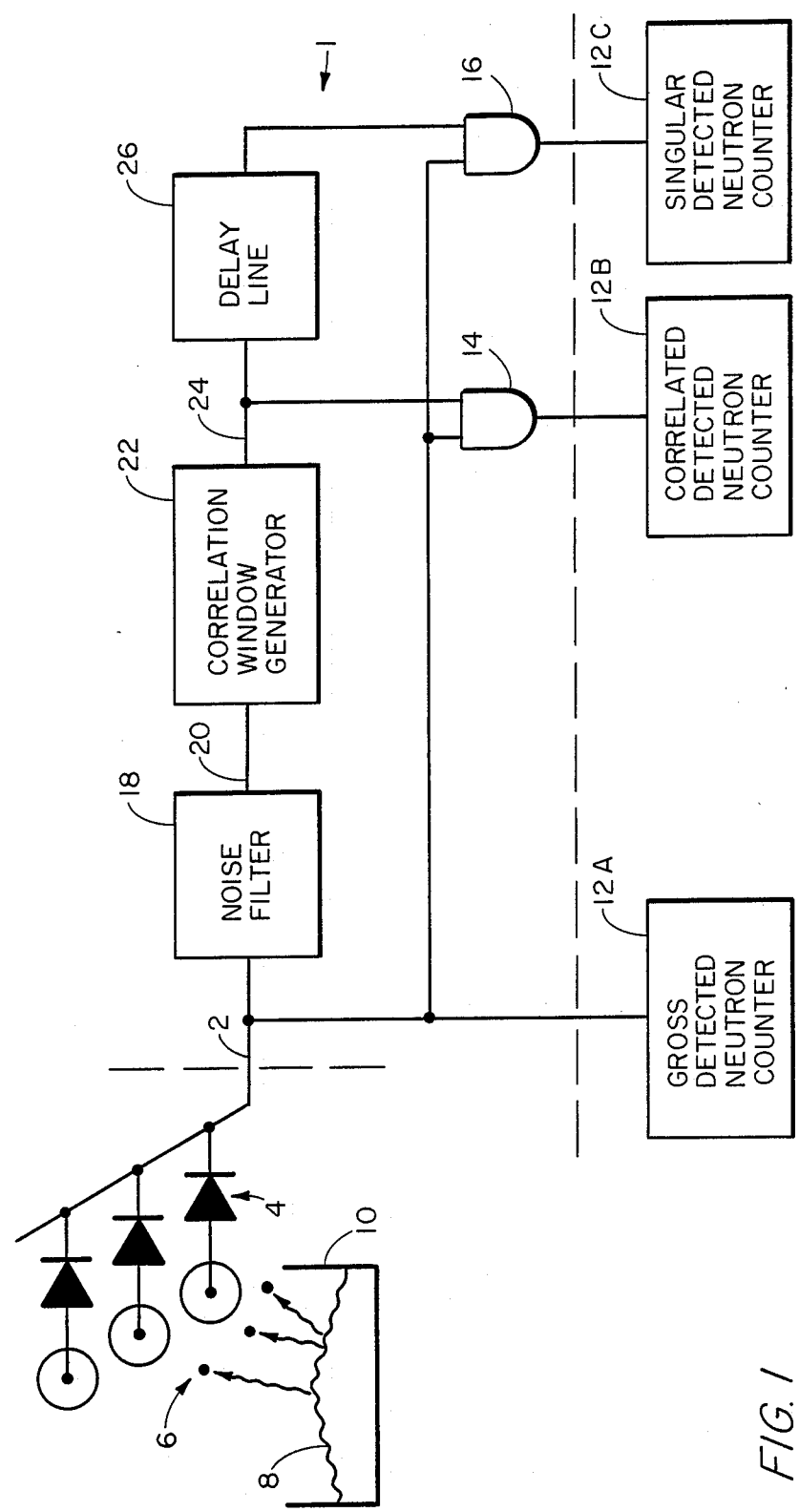
FIG. 1 is a block diagram of a circuit embodiment of the invention.

In the context of this application, the word "correlate", and any of its derivatives, will be used to mean correlated in time, or occurring within relative time intervals.

Counter circuit 1, shown in block diagram form in FIG. 1, has as its input on lead 2 detected neutron pulses. These detected neutron pulses are generated by neutron detector 4 in response to neutrons 6 emitted by a radioactive source 8 comprising both fissionable and nonfissionable materials housed in a container 10. Neutron detector 4 may be any of several industry standard neutron detectors, such as a Boron Triflouride ($BF_3$) type. For the purpose of describing this preferred embodiment, radioactive source 8 will be presumed to comprise enriched uranium fuel and be contained in an ash can 10.

Detected neutron pulses on input lead 2 are accumulated in gross detected neutron counter 12A, applied to one input each of logical AND gates 14 and 16, and applied to noise filter 18. Noise filter 18 is optional, but is preferably used to filter any electrical noise present on counter circuit input line 2. A determination of the need for noise filter 18 may be made based on the electrical characteristics of the detected neutron pulses generated by neutron detector 4, and the noise present in the operational environment in which the circuit will be employed. The filter also performs pulse shaping functions. Noise filter 18 may comprise an industry standard type 74123 retriggerable monostable multivibrator (one shot). A one-shot circuit, by the nature of its one-shot operation, filters out any closely spaced following electrical noise spikes of a kind often found in an operational environment. The multivibrator is connected to be rising edge triggered.

The detected neutron pulses, or, in the alternative, filtered detected neutron pulses, are applied on lead 20 to a correlation window generator 22. In response to the trailing edge of each input pulse, correlation window generator 22 generates a correlation window of a predetermined maximum duration on lead 24. Correlation window generator 22 is configured such that if no subsequent input pulses occur during the interval defined by the correlation window pulse, the output on lead 24 goes to zero after the predetermined period, terminating the correlation window pulse. The generator is retriggerable such that if an input pulse is received on lead 20 during a correlation window pulse, the time base of correlation window generator 22 is reset to zero. This terminates the existing correlation window pulse and generates an immediately following new correlation window pulse of equal maximum duration. The one or more pulses generated in adjacent sequence form a correlation window: Correlation window pulse generator 22 may comprise an industry standard (type 74123) one-shot integrated circuit which can be readily adjusted to operate in the retriggerable manner described herein.

The correlation window developed by generator 22 enables the remaining available input lead 24 to logical AND gate 14. Therefore, each detected neutron pulse which occurs at input lead 2 during the time interval defined by a correlation window passes through AND gate 14 as a correlated detected neutron pulse. These correlated detected neutron pulses are accumulated in correlated detected neutron counter 12B. Each correlation window developed at the output lead 24 of correlation window pulse generator 22 is also fed to delay line 26. Delay line 26 may comprise any one of a variety of industry standard delay lines. A clock driven shift register is preferred. In practice a 4 MHz TTL clock is used to drive a four bit counter (Type 74161). The resulting 0.455 MHz pulse rate is used to drive a 192 bit shift register (Type TDC 1004J). This results in delaying the arrival of the correlation window on the remaining lead into AND gate 16 by 422 microseconds. The entire duration of the correlation window is, however, preserved. The resulting window is termed, for convenience, a delayed coincidence window.

Each detected neutron pulse which occurs on input lead 2 during a delayed coincidence window passes through AND gate 16 as a singular detected neutron pulse. These singular detected neutron pulses are accumulated in singular detected neutron counter 12C.

Counters 12A, 12B and 12C, may be embodied in a general purpose digital computer.

FIG. 2 is a timing diagram further illustrating the operation of the counter circuit shown in FIG. 1. For the purpose of describing the preferred embodiment, the assumption is made that the fissionable material being assayed is enriched uranium fuel, which characteristically emits two correlated fission neutrons as a result of each fission reaction. Detected neutron pulses 30, 32, 34 and 36 are representative of correlated neutrons emitted by fission reactions. Detected neutron pulses 38 and 40 are representative of singular, uncorrelated neutrons.

As shown in FIG. 2, the trailing edge 44 of singular detected neutron pulse 38 triggers the generation of correlation window pulse 46 by generator 22. As discussed in the description of FIG. 1 above, correlation window pulse 46 terminates time t1 later, since no subsequent detected neutron pulses occurred to retrigger it defining a correlation window. Correlation window 46 is delayed by pulse delay 26 for an interval t2, to provide coincidence window 48 of equal duration t1. Since no windows are open (i.e. both the correlated and uncorrelated window pulses have not yet been generated) when singular detected neutron pulse 38 occurs, no pulses are developed by AND gates 14 and 16 for application to counters 12B or 12C.

The trailing edge 50 of detected neutron pulse 30 triggers the generation of correlation window for at least interval t1. Time t3 later, the trailing edge 54 of detected neutron pulse 32 causes window 52 to be regenerated for at least another interval of t1, and time t4 later the trailing edge 55 of detected neutron pulse 40 reinitiates window 52 for a third interval t1. As is shown in FIG. 2, each time pulse 52 is retriggered by the trailing edges of subsequent detected neutron pulses 32 and 40, the time base of window 52 is reset to zero, and window 52 is regenerated for another t1 interval. Window 52 terminates time t1 after the trailing edge 55 of the last triggering pulse 40. Window 52 is delayed by the interval t2, developing coincidence window 56 of duration t5, duration t5 being equal to the duration of window 52.

In like manner, the trailing edges 62 and 64 of pulses 34 and 36 result in the generation and regeneration, respectively, of window 66. Window 66, delayed for an interval t2, results in coincidence window 70. Window 70 is of equal duration t6 to window 66.

As is shown in the diagram, correlation window 52 exists when detected neutron pulse 32 occurs, and correlated detected neutron pulse 72 is developed. Both correlation window 52 and coincedence window 48 exist when detected neutron pulse 40 occurs, and both correlated detected neutron pulse 74 and singular detected neutron pulse 76 are developed, accordingly. In like manner pulse 36 and window pulse 66 develop correlated detected neutron pulse 82. Referring back to FIG. 1, correlated detected neutron pulses are accumulated in counter 12B, and singular detected neutron pulses are accumulated in counter 12C. All detected neutron pulses are accumulated in counter 12A.

Examining the relationship between input and output pulses, it is seen that the occurrence of four presumably fission event neutron detection pulses 30, 32, 34 and 36 yields two correlated detected neutron pulses 72 and 82. In the preferred embodiment of the invention, the first pulse of a correlated pulse train, in this example pulses 30 and 34, in effect open correlation windows and are not themselves counted. These pulses can be accounted for statistically if desired. It is also apparent that an occasional singular pulse, such a pulse 40, will cause the generation of a correlated detected neutron pulse, in this case pulse 74. Similarly, an occassional fission pulse could result in the generation of a singular detected neutron pulse, although such an event is exceedingly rare. The time delayed coincidence window is employed to eliminate the first of these sources of inaccuracy. Simply, the total count from counter 12C is subtracted from the total count from counter 12B. In the foregoing example such a subtraction would leave a correlated count of two. This result can be statistically factored into the computations used to assay the radioactive material.

The above explanations of FIGS. 1 and 2 describe in detail a preferred embodiment of the invention adapted to count neutrons emitted by low level radioactive material. It is understood that the invention, with an appropriate detector used in place of neutron detector 4, can be used to count any particles emitted by a material emitting correlated particles as a result of one type of event and singular particles due to other events. In fact, the circuit can develop its gross, correlated and singular counts in response to any detectable occurrence for which it is desired to accumulate such counts. The explanation below describes only one of the many uses for the counts developed by this invention. Specifically, the separate counts can be used to assay the quantity of fissionable material in a radioactive source.

Neutrons emitted as a result of a fission reaction are predominantly multiple and emitted in close time relation, i.e. they are correlated, and are of a known average quantity characteristic of the type of fissionable material being assayed. Neutrons, emitted as a result of nonfission reactions are predominantly singular and uncorrelated in time. While a fission reaction can result in the generation of a singular neutron, and nonfission reactions can occur in correlated multiples, these occurrences are normally statistically insignificant in assaying operations. They may, if desired, be accounted for through statistical calculation.

Radioactive material, such as uranium, characteristically emits two time correlated fission neutrons as a result of each fission reaction, and singular neutrons as a result of nonfission reactions. The invention described herein, by using the correlation window to predict detected correlated fission neutrons, and the coincidence window to predict detected singular neutrons, makes possible the calculation of the number of fission events which occurred in the radioactive material. Since the quantity of fissionable material in a radioactive source is proportional to the number of fission reactions occurring therein, the accumulated counts can be used to assay the radioactive source.

In the preferred embodiment of the invention, correlated fission neutron detections are accumulated in counter 12B, and singular neutron detections are accumulated in counter 12C. Pulse generator 22 is adapted to generate a correlated window pulse of approximately 80 microseconds, a duration statistically likely to correlate all fission neutron detections. Pulse delay 26 is adapted to provide an approximately 400 microsecond delay, an interval calculated to delay the uncorrelated window pulses well beyond a reasonable theoretical correlation time, statistically assuring that only neutron pulses not associated with an initiating fission event are counted within the uncorrelated windows. The duration of the pulse generated by correlating window pulse generator 22, and the length of pulse delay 26, are set according to the neutron emitting characteristics of the fissionable material being assayed and can be adapted to different intervals for different materials.

Depending on the type of material, and the environment in which the assay is being made, it may be desirable to statistically calculate the number of singular neutrons expected rather than to use the observed number accumulated in counter 12C. This number can be calculated as a function of the gross detected neutron count accumulated in counter 12A, the length of time over the detected neutron counts are accumulated, and the chosen correlated window pulse duration.

The number of fission events which occurred in the radioactive source can be calculated as a function of the correlated detected neutron pulses (accumulated in counter 12B) and the singular detected neutron pulses (statistically calculated or accumulated in counter 12C). Once the number of fission events has been determined, it is a simple matter to calculate the quantity of fissionable material in the source. While this calculation can be done statistically, in practical applications this quantity is often determined from a standard chart developed through empirical tests using known quantities of fissionable material.

In the preferred embodiment of the invention, all of the statistical calculations necessary to assay the quantity of fissionable material in the radioactive source are programmed on the general purpose computer 12. In practice, the neutron counts accumulated by this circuit are repeated several times over intervals and averaged to perform the assay calculations. The duration of each counting period is determined as a function of the material being assayed, and the operational characteristics and limitations of the counting circuit.

While the invention has been explained and described with the aid of the particular embodiment shown, it will be understood that the invention is not to be limited thereby and that many modifications retaining and utilizing the spirit of the invention will occur to those skilled in the art. It is, therefore, contemplated by the appended claims to cover all such modifications as fall within the spirit and scope of the invention.

What is claimed is:

1. A circuit for counting particles emitted by a particle-emitting material, said circuit comprising:
   means responsive to emitted particles for generating sensed particle pulses;
   first counting means for counting said sensed particle pulses;
   means responsive to said sensed particle pulses for generating window pulses, said window pulse generating means being further operative to generate window pulse of predetermined maximum time duration in response to each said sensed particle pulse which occurs during the interval of a previously generated window pulse;
   means for generating a second pulse in response to each said sensed particle pulse occurring during the interval of a previously generated window pulse; and
   second counting means for counting said second pulses.

2. The circuit of claim 1 further comprising:
   means for developing delayed window pulses by delaying said window pulses;
   means for generating a third pulse in response to each said sensed particle pulse occurring during the interval of a delayed window pulse; and
   third counting means for counting said third pulses.

3. The circuit of claim 2 further comprising noise filtering means connected between said sensed particle pulse generating means and said window pulse generating means.

4. A circuit for counting neutrons emitted by radioactive material, said circuit comprising:
   means responsive to emitted neutrons for generating detected neutron pulses;
   means responsive to said detected neutron pulses for generating a window pulse of predetermined time duration, said window pulse generating means being further operative to initiate a new window pulse in response to each said detected neutron pulse which occurs during the interval of a previously generated window pulse;
   means for generating first output pulses in response to each said detected neutron pulse occurring during the interval of a previously generated window pulse;
   first counting means for counting said first output pulse;
   pulse delay means for delaying each said window pulse for a predetermined interval to generate a second window pulse;
   means for generating a second output pulse in response to each said detected neutron pulse occurring during the interval of a previously generated said second window pulse; and
   second counting means for counting said second output pulses.

5. The circuit of claim 4 further comprising third counting means for counting said detected neutron pulses.

6. The circuit of claim 5 further comprising a circuit for filtering electrical noise, said filtering circuit being connected between said detected neutron pulse generating means and said first window pulse generating means.

7. The circuit of claim 5 wherein said window pulse generating means comprises a retriggerable one-shot pulse generator circuit.

8. The circuit of claim 7 wherein said means for generating said first output pulses comprises a first logical AND circuit having as its first input said window pulses and having as its second input said detected neutron pulses and having as its output said first output pulses.

9. The circuit of claim 8 wherein said means for generating said second output pulses comprises a second logical AND circuit having as its first input said second window pulses and having as its second input said detected neutron pulses and having as its output said second output pulses.

10. The circuit of claim 9 wherein said first, second, and third counters are embodied in a general purpose digital computer.

11. The circuit of claim 6 wherein said noise filtering circuit comprises a detected neutron pulse triggerable monostable multivibrator.

* * * * *